(No Model.)

W. F. LUTZ, Jr.
CAR AXLE.

No. 383,820. Patented May 29, 1888.

WITNESSES:

INVENTOR.
William F. Lutz Jr.
BY
Van Santvoord & Hauff
his ATTORNEYS,

UNITED STATES PATENT OFFICE.

WILLIAM F. LUTZ, JR., OF NEW YORK, N. Y.

CAR-AXLE.

SPECIFICATION forming part of Letters Patent No. 383,820, dated May 29, 1888.

Application filed February 2, 1888. Serial No. 262,730. (No model.)

*To all whom it may concern:*

Be it known that I, WILLIAM F. LUTZ, Jr., a citizen of the United States, residing at New York, in the county and State of New York, have invented new and useful Improvements in Axles for Cars and Conveyances, of which the following is a specification.

This invention relates to improvements in axles for cars and conveyances, and by means of this invention the wheels of said axle are enabled to turn independently of one another.

This invention is set forth in the following specification and claims, and illustrated in the accompanying drawings, in which—

Figure 1:
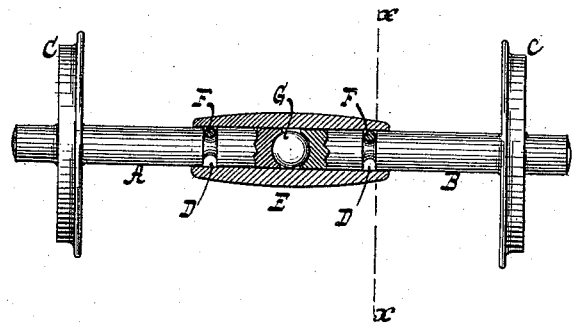
Figure 2:
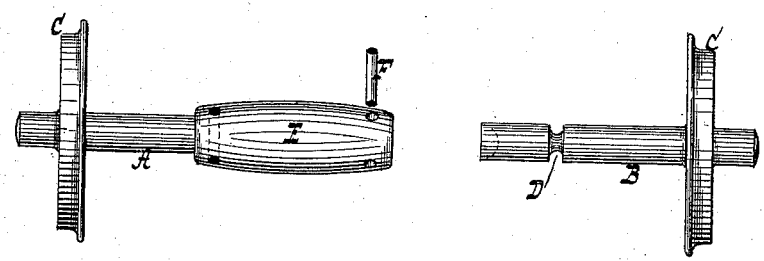
Figure 3:
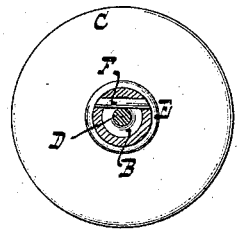

Figure 1 is a front elevation, partly in section, representing an axle. Fig. 2 is a front elevation showing the axle partly dismounted. Fig. 3 is a section in the plane *x x*, Fig. 1.

Similar letters indicate corresponding parts.

In the drawings, the axle is shown as having two sections, A B. Each section has a peripheral groove, D. A sleeve, E, is made to fit the two sections and is provided near each end with holes H H, which register with the grooves D when the sections A B are in place. Keys F, which consist of short pieces of metal or other suitable material, are passed through these holes and engage with the grooves D, thereby holding the sections within the sleeve and preventing their withdrawal therefrom until the keys are removed. The sections A B are thus secured to the sleeve, while each of said sections, with its wheel C, can turn independently of the other section and wheel.

Between the inner ends of the sections A B is placed a sphere, G. When one of the sections A B is thrust or pushed toward the sleeve E, the strain is partly taken up by the sphere G, so that the key F will not be exposed to excessive strain, which might be liable to break said key. Said sphere G can be made to rest against the inner ends of the axle-sections A B without preventing the sections from turning independently of one another. By providing the inner ends of the axle-sections A B with properly-shaped cavities the sphere G can be made to sit in said cavities.

What I claim as new, and desire to secure by Letters Patent, is—

1. The combination, with a divided axle consisting of the two sections A B, each having a peripheral groove, of a sleeve fitting upon and surrounding said sections and provided with holes passing transversely therethrough and registering with the peripheral grooves, keys passing through said holes and engaging with the peripheral grooves, and a sphere resting within said sleeve between the inner ends of the sections, substantially as described.

2. The combination, with a divided axle consisting of the two sections A B, each provided with a peripheral groove and having cavities in their inner ends, of a sleeve fitting upon said sections and having holes passing transversely therethrough and registering with the peripheral grooves in said sections, keys passing through said holes and engaging in the peripheral grooves, and a sphere resting within the cavities in the ends of the sections, substantially as described.

In testimony whereof I have hereunto set my hand and seal in the presence of two subscribing witnesses.

WM. F. LUTZ, JR. [L. S.]

Witnesses:
 CHARLES REHM,
 FRANK. MILLER.